United States Patent [19]

Wood et al.

[11] Patent Number: 4,602,974
[45] Date of Patent: Jul. 29, 1986

[54] METHOD OF SEALING PIPE

[76] Inventors: Eric Wood, 42 Haggs Hill Road, Ossett, West Yorkshire; Douglas Chick, Bayshill Cottage, Barnet Lane, Elstree, Hertfordshire, both of England

[21] Appl. No.: 492,366

[22] Filed: May 10, 1983

Related U.S. Application Data

[63] Continuation-in-part of Ser. No. 336,178, Dec. 31, 1981, abandoned, which is a continuation-in-part of Ser. No. 251,313, Apr. 6, 1981, abandoned.

[51] Int. Cl.⁴ .................. B29C 63/36; B29C 63/48
[52] U.S. Cl. .................... 156/287; 156/294; 427/230; 427/238; 118/408; 118/419; 118/DIG. 10; 405/150; 264/269; 264/516
[58] Field of Search .............. 156/285, 287, 286, 310, 156/294; 427/230, 238; 118/408, 150, 317, 323, DIG. 10, 306, 419, 269, 516; 239/559, 558

[56] References Cited

U.S. PATENT DOCUMENTS

| 3,333,311 | 8/1967 | Matheny et al. | 118/408 |
| 4,077,610 | 3/1978 | Masuda | 254/134.4 |
| 4,135,958 | 1/1979 | Wood | 156/287 |
| 4,182,262 | 1/1980 | Everson et al. | 156/294 |
| 4,368,091 | 1/1983 | Ontsuga et al. | 156/287 |
| 4,456,401 | 6/1984 | Williams | 156/294 X |

FOREIGN PATENT DOCUMENTS

| 2600618 | 7/1976 | Fed. Rep. of Germany | 156/294 |
| 54-04971 | 1/1979 | Japan | 156/294 |
| 55-21284 | 2/1980 | Japan | 156/294 |
| 55-41263 | 3/1980 | Japan | 156/294 |
| 1512035 | 5/1978 | United Kingdom | 156/287 |

Primary Examiner—Edward Kimlin
Assistant Examiner—Ramon R. Hoch
Attorney, Agent, or Firm—Louis Orenbuch

[57] ABSTRACT

A method of lining a pipeline or passageway with a flexible tubular liner. The liner is caused to evert in the pipeline by a fluid under pressure, and a former is used to smooth out the everting face of the liner and evenly apply resin over the everting face.

2 Claims, 16 Drawing Figures

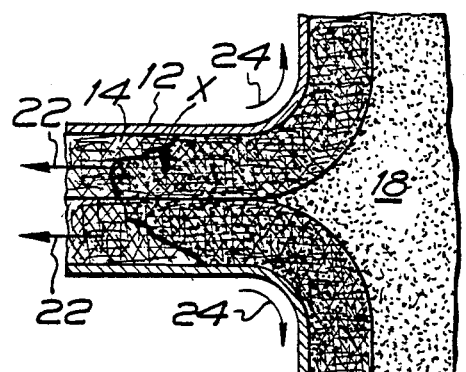
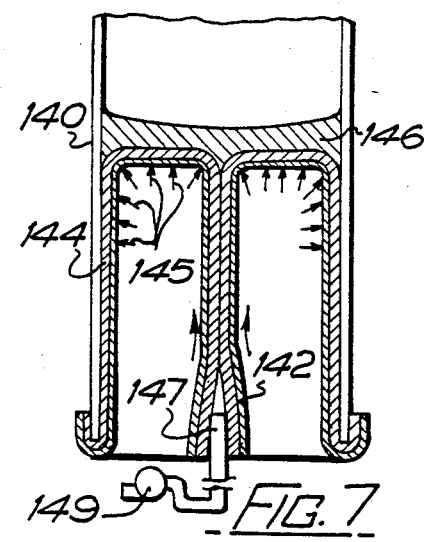
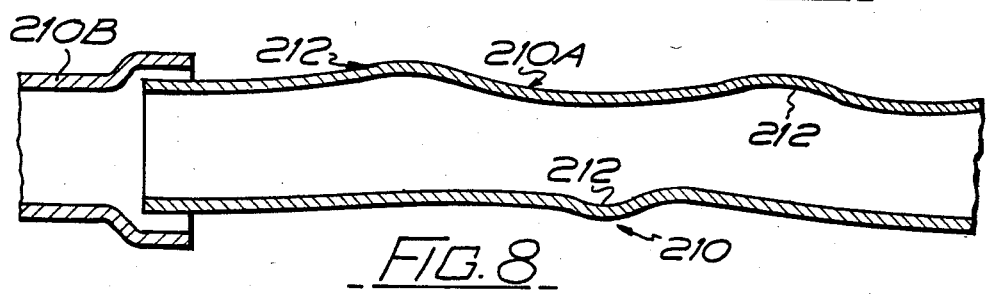
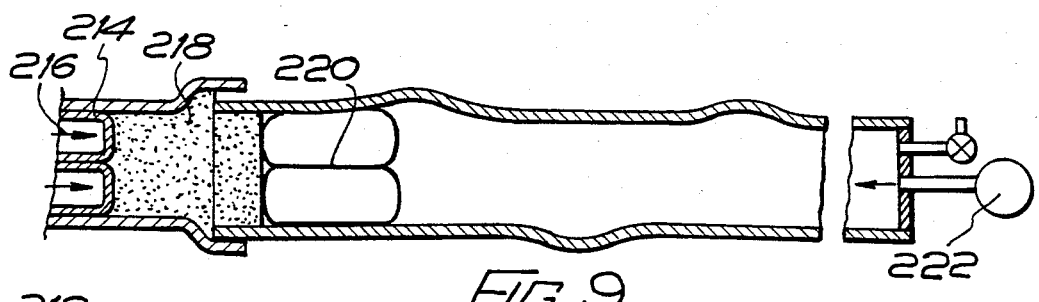
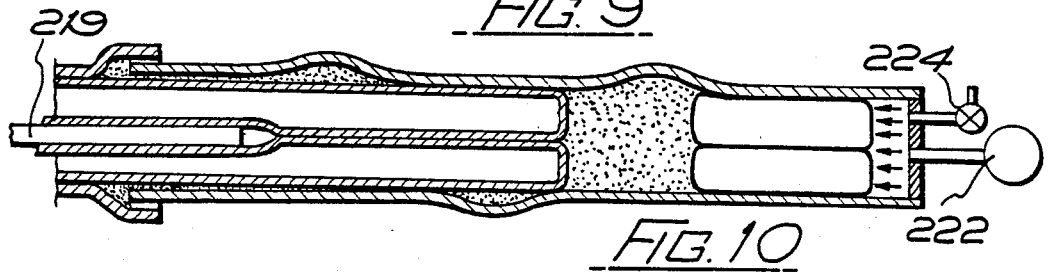
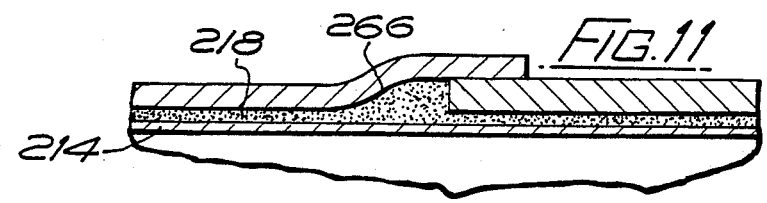

METHOD OF SEALING PIPE

This application is a continuation-in-part of applicants' prior application Ser. No. 336,178 which was filed on Dec. 31, 1981 and is now abandoned. That prior application is a continuation-in-part of applicants' earlier application Ser. No. 251,313 which was filed on Apr. 6, 1981 and is now abandoned.

This invention relates to the lining of pipelines and passageways. The lining may be for the purpose of curing leaks, cracks and fissures in such pipelines and passageways, or it may be for the purpose of simply providing an inner lining.

In some usages of underground pipelines, in particular in gas pipelines, there are pipe joints which are a source of trouble because of the occurrence of leaks and cracks at those joints which allow the leakage of the gas from the pipeline. That leakage can lead to dangerous situations, and in extreme cases explosion and bodily harm or even fatalities. It is therefore of considerable benefit if such pipelines can be repaired, rather than having to be replaced when the pipeline becomes unusable because of leaks, cracks of fissures.

Various methods have been proposed for curing leaks at pipeline joints, but those methods have by and large involved exposing the pipe joint by excavation and wrapping the joint externally with a sealing bandage or medium. That process whilst satisfactory has the disadvantage of requiring location of the leak and excavation of the ground at the site of the leak.

The present invention pertains to the repairing of leaks and also the lining of pipelines and passageways by the eversion into the passageway or pipeline of a flexible tubular member. It is known to evert flexible tubular members into pipelines and passageways to line same, but heretofore the known methods have involved the sticking of tubes to pipeline surfaces by means of adhesive, which process requires that the pipeline be pre-cleaned before the lining process can take place.

In the present invention, we envisage the use of a curable resin composition in order on the one hand to form a rigid pipelining and on the other hand to seal leaks and cracks in pipelines and passageways, by methods which do not of necessity require the pre-cleaning of the pipeline of passageway surface, and which envisage te application of the resin composition inside the pipeline or passageway.

In accordance with the method of the present invention for lining a pipeline or passageway, a flexible tubular laminate comprising a resin absorbent material inside a flexible membrane material is everted into the pipeline or passageway so that the resin absorbent material is applied to the surface to be lined, an uncured synthetic resin composition is applied directly to the everting portion of the resin absorbent material whilst in the pipeline or passageway, and a vacuum is applied to the inside of the laminate whilst it is in the pipeline or passageway to extract air from the resin absorbent material in the region where it everts to draw resin into the resin absorbent material at the point of eversion so that the resin is absorbed by the said resin absorbent material and then the resin is cured to form a hard lining in which the absorbent material is embedded, and the everted laminate is held by fluid pressure against the pipeline or passageway until the composition cures.

The membrane and composition may be such that the membrane bonds to the composition. The use of a vacuum inside the laminate is an extremely important aspect of this invention because the removal of the air from the resin absorbent material at the everting face places the resin absorbent material in the best condition to receive the resin presented thereto for the effective soaking or saturating of the resin absorbent material so that it will carry as much of the resin as possible without any air bubbles therein. Also, the resin absorbent material has only a short time to make contact with the resin and if it were full of air, this air would prevent effective penetration of the resin into the absorbent material. The resin can thus cure to a hard, homogeneous pipe wall having no voids and having the impact resisting resin absorbent material layer embedded therein.

The resin absorbent reinforcing material may be a tube of felt laminated with the flexible membrane so that the membrane and absorbent tube evert together, the absorbent tube initially being inside the membrane whereat the vacuum is applied, and after eversion, being located outside the membrane and being impregnated and soaked with the resin. Preferably, a resin composition with a slow curing time is used to give the resin sufficient time thoroughly to soak through the absorbent material.

The method of the invention may be applied in relation to long or short pipeline lengths and also to pipeline lengths which are disposed vertically as well as horizontally. Thus, it can be applied to the lining of a vertically disposed pipeline length, such as a precast concrete pipe, by causing the lining membrane and the absorbent material to be everted upwards through the pipe, the composition being applied by forming a pool of the composition on top of the everting laminate.

This aspect of the invention provides, in pipelines and passageways, a hard lining which is resistant to abrasion experienced for example when abrasive objects pass along the pipeline or passageway, and which also forms an effective seal against the escape of gas or other fluids from the pipeline or passageway. The lining also forms a barrier against the ingress of liquid or gas into the interior of the pipelines or passageways from the outside thereof.

According to a preferred feature of the invention, the curing of the resin composition is controlled by the employment of a catalyst.

It is known that the inclusion of a catalyst in a synthetic thermosetting resin composition can accelerate the curing of the resin considerably, but clearly the resin must not be allowed to set too quickly in the methods of the invention, as otherwise there would not be be sufficient time to position the liner against the pipeline or passageway to be lined. In accordance with the preferred feature of the present invention, a catalyst for accelerating the cure of the resin composition is embodied in the absorbent material so that accelerated cure of the resin composition only commences upon said composition being applied to the absorbent material.

The advantageous effects of this preferred method can readily be understood. The resin composition is presented to the absorbent material, is absorbed thereby and rapidly accelerates to curing by contacting the catalyst at the time of carrying out the installation process.

The thermosetting resin composition may be an epoxy resin and the absorbent material may be a polyester felt.

In order to ensure that the resin composition is applied evenly and effectively to the absorbent material, a further prefered feature of the present invention provides that a plug of the resin composition is pressed against the everting end of the everting member. By so pressing the plug there is applied a "back pressure" to the resin composition which ensures that the composition is fored as well as being pulled by the vacuum into the absorbent material effectively and evenly to impregnate the same, and also to ensure that the composition flows through the absorbent material if necessary into holes, recesses cracks and the like in the interior of the passageway or pipeline. The back pressure may be applied by a retaining shield which also serves to prevent the escape of resin composition into branch pipelines or passageways connecting with the pipeline or passageway being lined.

By this aspect of the invention it is ensured that the composition fills cracks, recesses, hollows and the like in the pipeline but forms only a small thickness skin over other sections of the pipeline, ensuring that there is minimum usage of the resin composition.

The invention also provides a pipeline or passageway which is lined in accordance with the method of either aspect of the present invention.

Embodiments of the present invention will now be described by way of example, with reference to the accompanying diagrammatic drawings, wherein.

Figure 1:
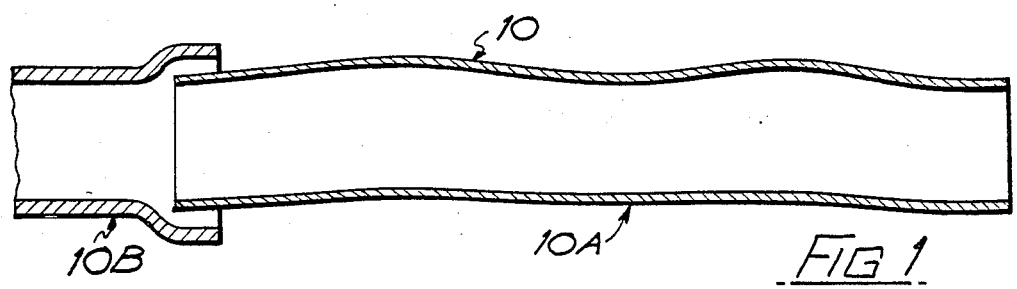
FIG. 1 is a sectional elevation of a pipeline section, including a pipe joint, to be lined.
Figure 3:
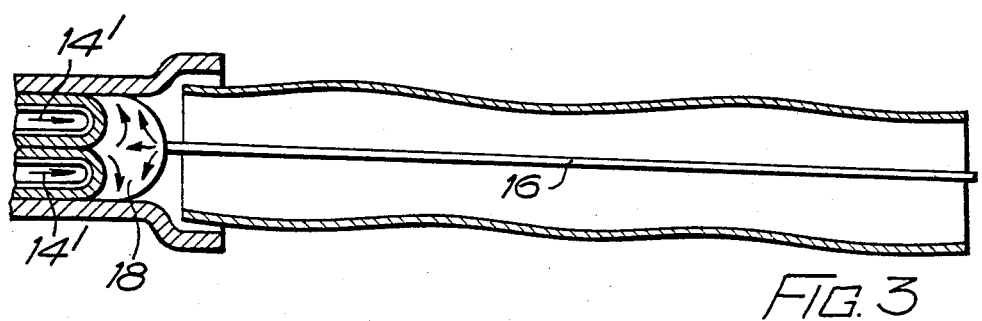
Figure 4:
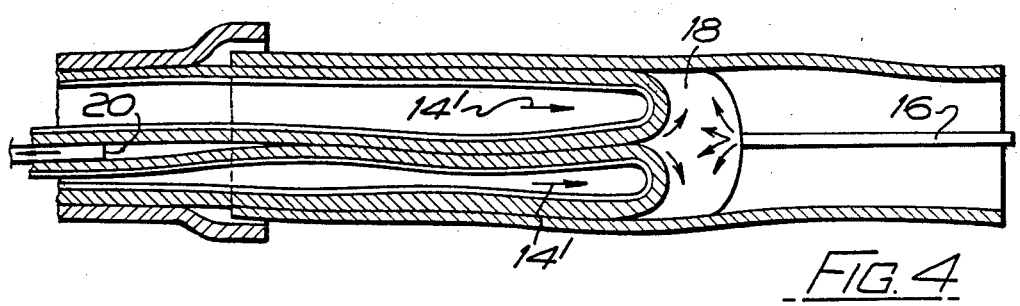
Figure 5:
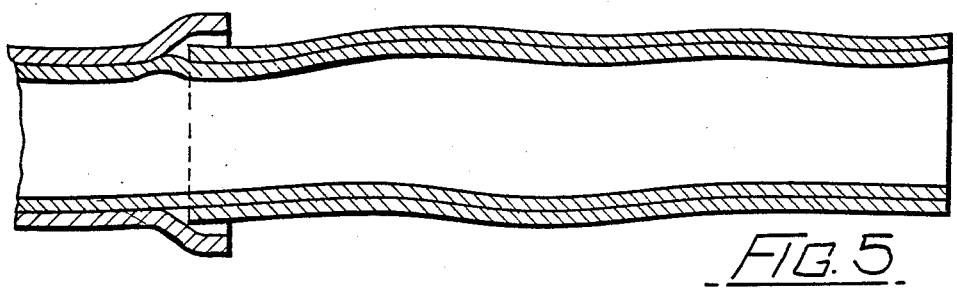

FIGS. 3, 4 and 5 respectively are sectional elevations of the pipeline shown in FIG. 1, and these figures respectively show various stages in the method of the invention according to this embodiment;

FIG. 6 is a detail sectional elevation showing the laminate at the point of eversion and the action of sucking the resin into the centre of eversion;

FIG. 7 illustrates, in sectional elevation, a length of pipe being lined in accordance with another embodiment of the present invention;

FIG. 8 illustrates in sectional elevation a section of pipeline to be lined in accordance with another embodiment of the method of the invention;

FIG. 9 is a sectional elevation of the pipeline shown in FIG. 8 but showing the method of lining the pipeline in accordance with this embodiment of the invention;

FIG. 10 is again a sectional elevation ofhe pipeline shown in FIG. 8 but showing the process at a later stage;

FIG. 11 is a sectional elevation of a detail of FIG. 10.

Figure 12:
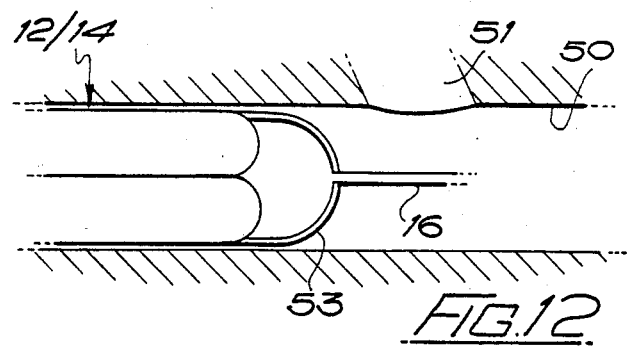
Figure 13:
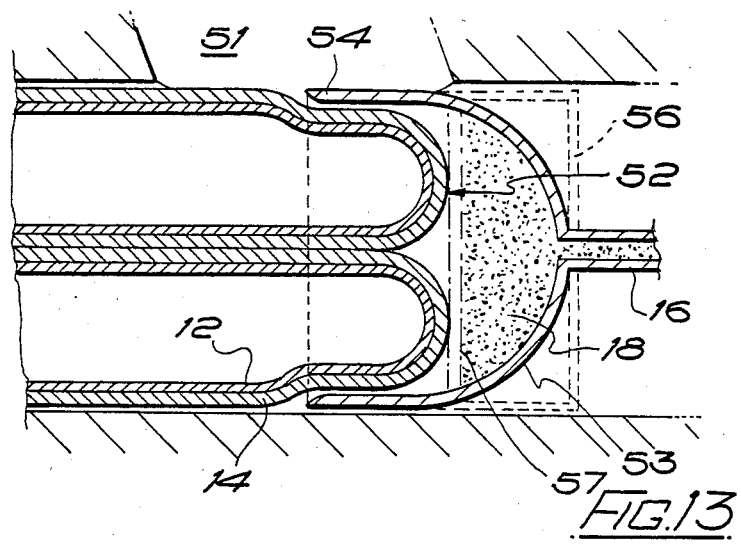
Figure 14:
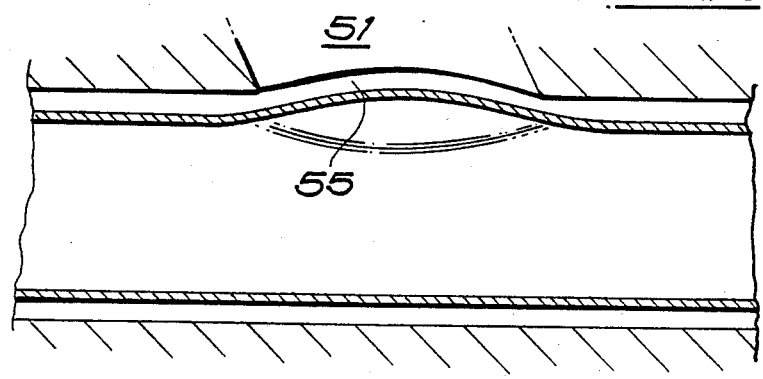
Figure 15:
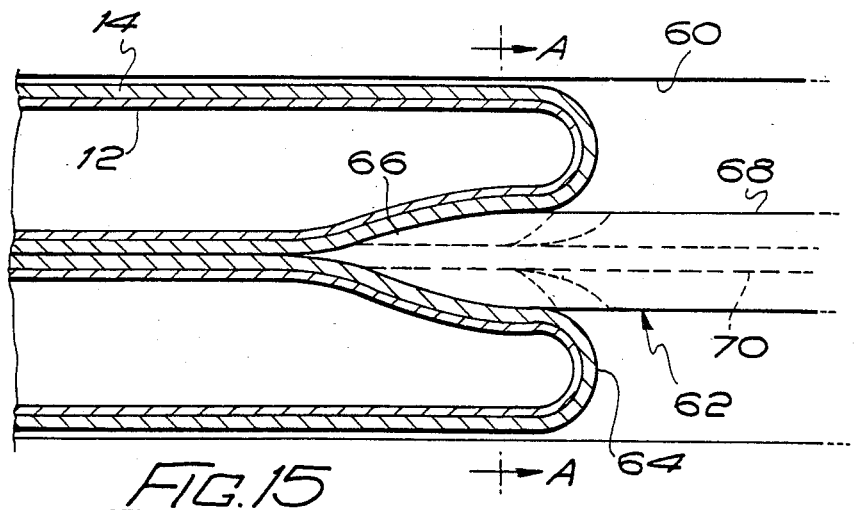
Figure 16:
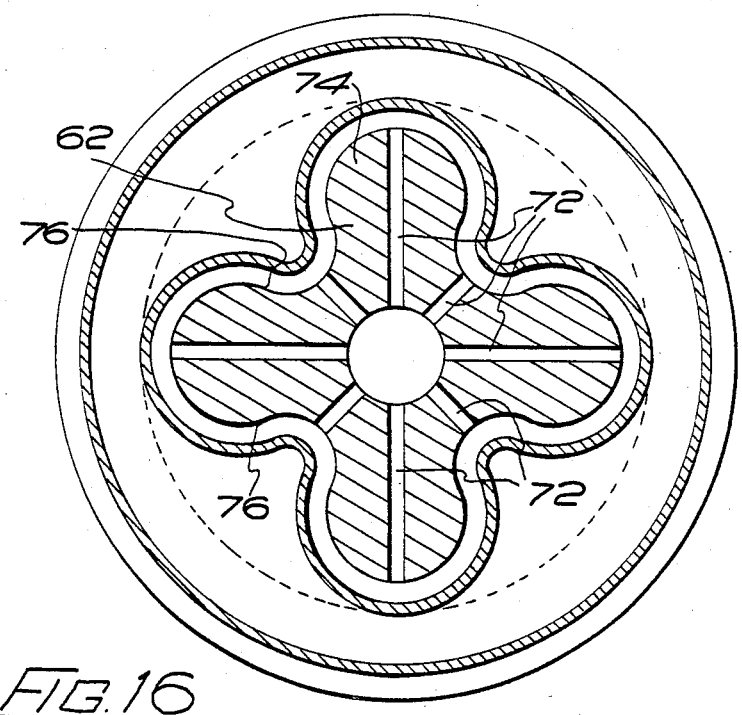

FIG. 12 is a sectional view showing the lining of a passageway having a branch connection;

FIG. 13 is an enlarged sectional view of a detail of the method shown in FIG. 12, as the everting face passes the location wherein the branch connection meets the passageway being lined;

FIG. 14 is a sectional view of the passageway of FIG. 12 after the lining operation;

FIG. 15 is a sectional view showing the lining of a passageway according to a modified method of the invention; and FIG. 16 is a sectional end view on the line A—A of FIG. 15.

Referring to FIG. 1, there is shown a pipeline section 10 made up of portions 10A and 10B, the portion 10B being enlarged at the end shown, so as to overlap the adjacent end of the portion 10A, so as to define a pipe joint as shown.

This pipe section 10 is to be lined with a relatively thick layer of hard thermosetting resin, so as to seal the interior of the pipe section from leaks, and to increase its internal resistance to wear.

Figure 2:
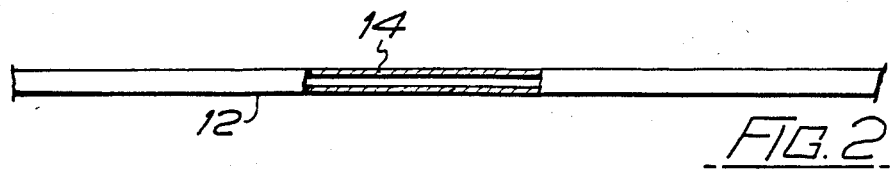
FIG. 2 is a side view, partly in section of a tubular laminate used in the lining operation.

For this purpose, a laminate as shown in FIG. 2 is used. This is a tubular laminate, and comprises an outer skin 12 of a material, such as plastics material in the form of polyvinyl chloride or polyethylene, which is relatively impermeable to a gas such as air or a liquid such as water, by which the tube will be everted into and along the pipe section. Inside the tubular skin 12 is a tubular liner 14 of a resin absorbent material, such as felt or flexible porous plastics foam material, or even a mixture of these materials. Although it is not essential to all aspects of the invention, this absorbent tube may previously have been treated with a catalyst or accelerator, for example which "sets off" the particular resin which may be an epoxy or polyester resin is used in this example, name an epoxy resin.

In order to evert the tubular laminate 12 into and along the pipe section 10, one end of the laminate is anchored firmly, and then a liquid or a gas under pressure is used to force or blow the laminate into and along the tube length 10 as shown in FIGS. 3 and 4. Arrows 14' in these figures illustrate the application of the fluid pressure.

Into the other end of the pipeline section is introduced a supply pipe 16 from which is delivered a quantity 18 of the resin, so that this resin is presented to the everting face of the laminate, and comes into contact with the catalyst impregnated absorbent tube 14, immediately before such tube everts against the inner surface of the pipeline section 10. FIG. 4 shows the operation in a more advanced stage, and FIG. 5 shows the pipe section after hardening of the lining in which is embedded the absorbent tube 14. In some cases the membrane 12 may bond to the resin and therefore will remain in place to form a smooth inner surface. It may be necessary to trim the ends of the hardened liner of resin. Indeed, the skin 12 may be a coating applied to tube 14 so as to be integral therewith. It will be seen, as a comparison between FIGS. 3 and 4, that the tube 16 progressively is moved towards the right as the operation proceeds. It can be appreciated that the lining forms an effective seal even across the joint in the pipeline shown.

In order to achieve effective penetration of the resin composition 18 into the resin absorbent layer 14, a vacuum is applied to the inside of the laminate before it everts in the passageway. This vacuum is applied through a vacuum pipe 20 shown in FIG. 4, and the vacuum may be drawn by means of a suitable vacuum pump. The vacuum may be drawn at any suitable location and FIG. 4 gives only one example of how it can be applied. The effect of the vacuum is to withdraw air from the inside of the laminate in the region prior to eversion. This means that in the very centre of the everting face, there will be a negative pressure and the resin will therefore be induced into the "eye" of the eversion. If reference is made to FIG. 6, the everting region is shown in detail. The arrows 22 indicate the negative pressure pull on the resin 18, and reference X indicates how the resin has in fact been induced into the centre of the everting portion, against the movement of the everting laminate in an outwardly folding direction as indicated by the arrows 24 in FIG. 6. The vacuum applied in this region removes air from all of the spaces in the resin absorbent material, and the vacuum thus created is filled by the resin 18 which penetrates deeply and thoroughly into the resin absorbent material. By the use of this vacuum, in a short time the resin composition totally and completely impregnates the resin absorbent layer 14, without any voids, which results in an even homogeneous layer of resin, in which the absorbent and strengthening layer 14 is immersed, being applied to the wall of the passageway to be lined. This even and thorough impregnation is obtained in a very short space of time i.e. between the travel of each portion of the everting laminate from the eversion region to the inner surface of the pipeline which is being lined.

Referring now to FIG. 7, in this FIG. reference numeral 140 represents a concrete pipe to be lined. It will be seen that the pipe 140 stands upright and it is lined from the bottom end by everting into the pipe 140 a flexible lining tube membrane 142, which is laminated with a tube 144 of a resin absorbent material such as polyester felt material. The felt 144 lies inside tube 142 before it everts as shown in FIG. 7 after which the absorbent tube 144 lies outside tube 142. The eversion is by means of air under pressure acting on the lining tube 142 as indicated by the arrows 145 in FIG. 7 and the uncured synthetic resin is applied to the felt tube by being in the form of a pool 146 formed on the everting surface of the laminate 142, 144. The vacuum is applied to the inside of the laminate before it everts, for the purposes already explained herein, by vacuum pipe 147 and vacuum pump 149. The resin soaks thoroughly into the absorbent tube 144 and through it, leaving no voids so as to make contact with the inner tube 142. The process is continued until the whole of the pipe 140 has been lined with the resin impregnated tube 144, appropriate resin being added to the pool 146 as desired. The resin is either allowed to cure naturally with the passage of time or is forced cured by the application of heat and then the lining is trimmed to the pipe length as desired. In this example of the method of the invention the inner membrane 142 either can remain with the cured resin or it may be such as to be strippable from the resin lining (containing the absorbent tube 144 embedded therein) after the resin has cured. This embodiment of the invention is extremely useful for rendering pipe lengths suitable for carrying material for which they would otherwise be unsuited. For example, concrete pipe lengths can be made suitable for transporting corrosive materials which attack concrete but do not affect the resin lining.

In the embodiment of FIG. 7 the felt can be provided with a catalyst as described in relation to the embodiment of FIGS. 1 to 6.

Referring now to FIGS. 8 to 11 of the drawings, in FIG. 8 there is shown a pipline 210 which has two sections 210A and 210B and the section 210B is enlarged at the end shown so as to overlap the adjacent end of the section 210A, and to form a pipe joint. The section 210A is shown as having bumps and recesses 212 which it can be assumed, arose as a result of use of the pipeline and the effluxion of time. Let it be assumed that the pipeline shown is a gas main, and that the joint between the sections 210A and 210B and the bumps or recesses 212 are sources of leakage, and it is desired to line the pipeline so as to seal these points of leakage.

In accordance with the method of this embodiment of the invention a tubular laminate as illustrated in FIG. 2 is used in the process. In the drawings, the laminate is indicated by reference numeral 214.

In order to line the pipeline the tubular laminate 214 is everted into the pipeline as shown in FIG. 9. To do this, one end of the tube is firmly fixed and sealed at one end of the pipeline, and then the tube 214 is everted by applying fluid under pressure such as air or gas, or steam or even a liquid, or a combination of such fluids, the pressure applied being indicated by the arrows 216 in FIG. 9. Also as described in relation to FIGS. 1 to 6, a vacuum is applied to the inside of the tubular laminate so that the vacuum is present at the everting face. In this example, the tubular laminate 214 is everted against a plug 218 of a fluent lining composition such as epoxy resin, which is located in the pipeline and at the other side of the plug there is in this example a pipeline pig 220 which is a tube turned inside upon itself and having the ends sealed together. The pig 220 is inflated so as to bear against the inner wall of the pipeline as shown. The other side of the pig has fluid under pressure applied thereto, for example by pump 222, so as to force the pig against the plug 218 so that the plug 218 is trapped between the everting laminate 214 and the pig 220. This arrangement provides for the application of pressure to each side of the plug 218, with the effect that the plug material is forced against the pipeline walls as well as the everting laminate as the lining operation proceeds. As the laminate 214 is everted into and along the inside of the pipeline 210, so the material of the plug 218 is wiped against the inner wall of the pipeline, and the plug 218 and pig 220 move along the pipeline. FIG. 10 shows the process at a later stage, when the pig 220 has moved nearly to the end of the section of pipeline which is shown in the drawings. This figure also shows the vacuum pipe 219. During the movement along the pipeline the air under pressure supplied from pump 222 is relieved through a one way valve 224.

At the completion of the lining operation, the inner surface of the pipeline 210 is provided with a skin of the lining material 218 as shown clearly in FIG. 11 moreover the lining material is forced into crevices or recesses, such as at 266 as shown in FIG. 11 in the region of the pipe joint, forming an effective seal at such recesses or crevices.

It is appreciated that it is not necessary to use the pipeline pig 220 shown in the drawings, and in some cases this may be omitted, the counter pressure on the plug being provided simply by a supply of air from the pump 222.

Furthermore, any suitable medium may be used for pressurising the pipeline on the downstream side, to maintain the application of pressure on each side of the plug, but it will be appreciated that in order to achieve movement of the everting laminate along the inside of the pipeline, the pressure in the everting laminate must be greater than that in the downstream section of the pipeline. It is to be noted also that the lining medium fills the bumps and hollows 212, as shown in FIG. 10 effectively sealing such locations against leakage.

In the arrangement shown in FIGS. 12, 13 and 14, an underground passageway 50 with a branch connection pipe 51 is shown as being lined in accordance with the method described in relation to FIGS. 1 to 7. This is to say, the laminate 12/14 is being everted along the passageway 50 to line same, and a vacuum is applied to the interior of the laminate so that the vacuum is present at the everting face 52 drawing the resin 18 into the resin absorbent material 14 of the laminate at the everting face 52.

Instead of the resin simply being sprayed from pipe 16 as in FIG. 4, the resin is retained in a retaining shield 53 in the form of a dished cup of which the outer edge 54 approximates to the diameter of the passageway 50 and embraces the everting end of the laminate in order to prevent, as shown in FIG. 13, resin from escaping into the branch connection 51. The shield may be of thin sheet material such as plastics or metal so that it will slip along the passageway as eversion proceeds, but it is shaped so as to contain the everting face 52 and with such everting face, form a closed chamber for the resin 18 which is charged into the chamber along pipe 16; pipe 16 can also form the means for pulling the shield 53 along the passageway 50. The shield will also be pushed along the passageway by the everting laminate end therefore the back pressure to be provided by the resin end shield need only be quite small, but care should be taken to ensure that the everting laminate does not trap or jam the edge 54 of the shield 53 which could terminate the eversion process.

FIG. 14 shows how the installed laminate lies over the branch connection opening 51 and bulges thereinto. Subsequently, it is necessary to re-establish the connection between the branch connection 51 and the passageway 50 by removing portion 55 of the lining hence the reason why it is desirable that the resin should be prevented from flowing into the branch connection 51 during eversion.

Instead of using a dished cup 53 a cylindrical box as indicated by dotted lines 56, may be used. In another arrangement, a flat plate as indicated by dotted lines 57 may be applied to the everting face to retain the resin 18 in a chamber extending from the eye of the everting face to where the everting face lies tangent to said plate. The plate will of course be provided with a hole through which the resin is supplied to said chamber.

Referring to the arrangement of FIGS. 15 and 16, again the laminate 12/14 is being everted along a passageway 60, to line same, in the method as described in relation to FIGS. 1 to 6, with vacuum applied to the interior of the laminate. However, a smoothing member 62 is engaged with the everting face 64 of the laminate as shown. The smoothing member 62 serves two purposes namely to shape the laminate around the smoothing member as shown in FIG. 16, and to distribute resin over the everting face of the laminate. The smoothing member has a tapered nose 66 which extends into the everting face 62, the tapered nose 66 leading to a cylindrical section 68. The resin is fed along a bore 70 in the smooting member, and is distributed to the laminate along a plurality of passages 72 as shown in FIG. 16.

The tapered nose 66 which engages with the everting face 64 has a lobed cross-section defining crests 74 and valleys 76 and the laminate is sucked onto the former to follow these crests and valleys by virtue of the existence of the vacuum in the interior of the laminate. The cross-sectional circumference of the tapered nose gradually increases until its periphery reaches a maximum cross-sectional circumference that is approximately equal to the inner circumference of the pipeline or passageway being lined. By this expansion, the laminate is kept smooth and free of creases as it everts, thereby enhancing the impregnation process. The smoothing member 62 moves along the passageway with the everting face 64, and the laminate slips over the tapered nose 66 as it everts. This modification may be used in any of the embodiments described in relation to FIGS. 1 to 14.

It is to be appreciated that the method of the invention can be applied to any pipeline or passageway, whether underground or not, and can be utilised in connection with the embodiments of the invention described in relation to FIGS. 1 to 7.

We claim:
1. A method of lining a pipeline or passageway comprising the steps of
   a. causing a flexible tubular laminate comprised of a flexible resin absorbent liner disposed within a flexible membrane to evert as the laminte moves into the pipeline or passageway whereby the everted liner is disposed between the everted membrane and the surface to be lined,
   b. causing the tapered nose of a smoothing member to extend into the liner at the site where eversion of the liner occurs in the pipeline or passageway whereby the everting face of the liner is smoothed as it moves over the narrower end of the tapered nose toward a larger portion whose maximum cross-sectional circumference is approximately equal to the inner circumference of the pipeline or passageway being lined,
   c. causing an uncured synthetic resin composition to be applied directly to the everting face of the liner through distribution passages in the smoothing member whereby the resin composition is evenly spread over said everting face,
   d. applying a vacuum to the interior of the uneverted laminate while the laminate progresses into the pipeline or passageway whereby the uncured resin composition is drawn into the resin absorbent liner at the site of eversion, and
   e. causing the everted laminate to be held by fluid pressure against the pipeline or passageway while the resin composition cures whereby a hard lining is produced in the pipeline or passageway.

2. The method of lining a pipeline or passageway according to claim 1,
   wherein the tapered nose of the smoothing member employed in step b has a plurality of lobes forming an undulant peripheral surface having said maximum cross-sectional circumference.

* * * * *